United States Patent Office 3,242,145
Patented Mar. 22, 1966

3,242,145
CURING OF EPOXIDES WITH ACID ANHYDRIDES AND VANADIUM CHELATES
Richard John Martin, Cambridge, England, assignor to Ciba Limited, Basel, Switzerland, a Swiss company
No Drawing. Filed Apr. 30, 1963, Ser. No. 277,041
Claims priority, application Great Britain, May 8, 1962, 17,692/62
12 Claims. (Cl. 260—78.4)

This invention relates to hardenable compositions containing unsaturated esters having one epoxide group, and to the hardened products derived therefrom.

It is well known that compounds containing more than one epoxide group may be converted into hardened, cross-linked, i.e. insoluble and infusible, products by the action of polycarboxylic acids or their anhydrides. It is also known that monoepoxides may sometimes advantageously be added to these polyepoxides, for example to reduce the viscosities of the hardenable mixtures. However, a disadvantageous effect of the addition of such monoepoxides is normally a reduction in the thermal stability (i.e. the retention of mechanical strength at elevated temperature) of the resulting hardened products, presumably as a result of a decrease in the extent of crosslinking caused by the addition of the monoepoxides in question. The action of an anhydride of a dicarboxylic acid, or of the dicarboxylic acid itself, or of certain metal-containing organic compounds (chelate compounds), on a monoepoxide alone, generally results in the production of a polymer which is essentially linear, and has little or no degree of cross-linking. Although it is known that even monoepoxides may be transformed to crosslinked products by reaction with compounds which contain more than one acid anhydride grouping (for example bisanhydrides such as pyromellitic dianhydride), this process has the disadvantage that hardening agents of this type are normally high-melting solids with low solubility in epoxy-compounds. Thus, they are difficult to dissolve in the monoepoxides, and the resulting mixtures have short "pot-lives" (usable lives) at the relatively high temperatures which are necessary to keep these poly-functional hardening agents in solution.

The present invention provides hardenable compositions comprising a monoepoxy unsaturated ester of the general formula:

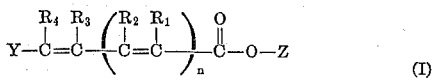

(I)

wherein Z represents a cyclic or acyclic aliphatic residue having one epoxide group, Y represents a hydrogen atom or an alkyl or alkenyl residue, $R_1$, $R_2$, $R_3$ and $R_4$ may be the same or different and each represents a hydrogen atom or a monovalent substituent, preferably a lower alkyl group (i.e. an alkyl group containing from 1 to 4 carbon atoms), and $n$ is 0 or 1; a di- or poly-carboxylic acid or anhydride thereof, and a metal chelate compound of the general formula:

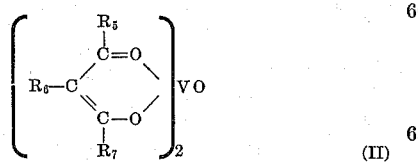

(II)

wherein $R_5$, $R_6$ and $R_7$ may be the same or different and either each represents a hydrogen atom or a substituted or unsubstituted aromatic, araliphatic or cyclic or acyclic aliphatic saturated or unsaturated hydrocarbon residue or $R_5$ represents a hydrogen atom or a said residue and $R_6$ and $R_7$ together represent a saturated or unsaturated chain of atoms. Where any of the groups $R_5$, $R_6$ and $R_7$ are substituted, the substituents may be, for example, hydroxy or acetoxy groups.

The monoepoxy esters of general Formula I may be hardened rapidly and conveniently by heating these compositions and a process for hardening the compositions by heating them is within the scope of the invention. Since anhydrides of dicarboxylic acids, or mixtures thereof, usually have lower melting points and better solubilities in epoxy resins than do bisanhydrides, comparatively low temperatures are needed to maintain homogeneous solutions, and thus such solutions generally have acceptably long pot lives. The products which are obtained by hardening the new compositions show surprisingly high mechanical strength and dimensional stability at elevated temperatures when compared with those products which are obtained by hardening monoepoxides with dicarboxylic acids or anhydrides in the absence of the metal chelate compounds of general Formula II.

The unsaturated monoepoxy-esters of general Formula I are transparent compounds which are liquid at room temperature or readily fusible; on hardening by the new process they yield cured, i.e. insoluble and infusible, products of very valuable technical properties.

The preferred esters of Formula I are those which conform to the general formula:

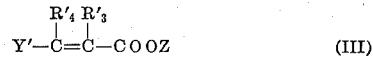

(III)

and those which conform to the general formula:

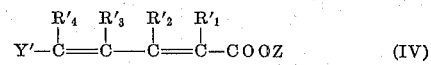

(IV)

in which Y′, R′$_1$, R′$_2$ R′$_3$ and R′$_4$ represent hydrogen atoms or lower alkyl groups and Z has one of the following formulae:

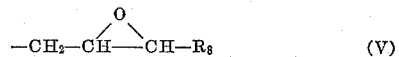

(V)

in which $R_8$ represents a hydrogen atom or an alkyl group:

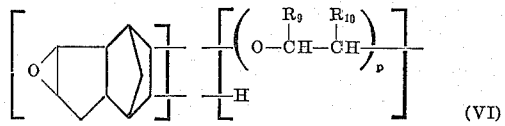

(VI)

wherein $R_9$ and $R_{10}$ may be the same or different and each represents a hydrogen atom or a methyl group and $p$ is 0 or an integer from 1 to 10;

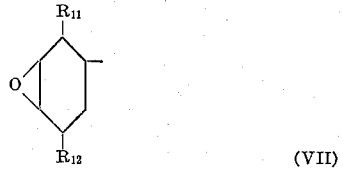

(VII)

wherein $R_{11}$ and $R_{12}$ represent hydrogen atoms or together represent a methylene group;

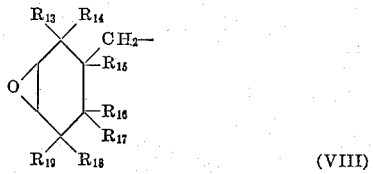

(VIII)

wherein $R_{13}$, $R_{14}$, $R_{15}$, $R_{16}$, $R_{17}$, $R_{18}$ and $R_{19}$ may be the same or different and each represents a hydrogen atom or a lower alkyl group, or $R_{13}$ and $R_{18}$ together represent a methylene group and $R_{14}$, $R_{15}$, $R_{16}$, $R_{17}$ and $R_{19}$ have the same meanings given above;

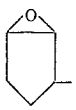
(IX)

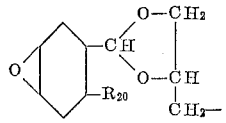
(X)

or

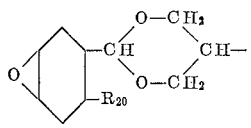
(XI)

wherein $R_{20}$ represents a hydrogen atom or a lower alkyl group.

Specific examples of preferred esters of Formula I are the sorbates, acrylates and methacrylates of either epoxy-dihydrodicyclo-pentadienol, or the ethylene glycol mono-ether of epoxy-dihydrodicyclo-pentadienol, or glycidyl alcohol, or 3-oxa-tricyclo(3,2,1,0$^{2,4}$)oct-6-yl alcohol.

The esters of general Formula I may readily be obtained by reacting an ester of the general formula

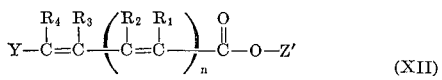
(XII)

in which Z′ represents a lower alkyl group and the other symbols have the meanings assigned to them above, with an epoxy-alcohol of formula Z—OH, where Z has the meanings assigned to it above.

This transesterification reaction, which is represented by the equation: (XII)+Z—OH⇌Z′—OH+(I), is preferably effected in the presence of a catalyst such as an alkoxide, hydride or alkyl derivative of a metal in Groups IA, IIA or IVB of the Periodic Table, or a carboxylate of a metal of Groups IIB or IVA of the Periodic Table. These catalysts may be either added as such or formed in situ. (The groups referred to above are as designated in "Handbook of Chemistry and Physics," Chemical Rubber Publishing Co., Ohio, 43rd edition, 1961–2.) Particularly suitable catalysts are: the alkoxides of the alkali and alkaline earth metals such as sodium methoxide, sodium ethoxide, potassium butoxide and calcium ethoxide; quaternary ammonium hydroxides and quaternary ammonium hydroxide-containing ion exchange resins, such as those sold under the registered trademarks "Amberlite IRA–400," "Amberlite IRA–401," "Dowex" and "De-Acidite FF"; organometallic substances such as dibutyl tin oxide and tetrabutyl titanate; and salts such as zinc or cadmium acetate.

Such catalysts may, if desired, be left in the crude product I. Often it is advantageous to have present also in the reaction medium a substance, such as hydroquinone, which is an inhibitor for free-radical polymerisations. Such inhibitors may also advantageously be left in the crude epoxy ester of Formula I which is obtained by the process represented by the aforesaid equation. The transesterification reactions may be conducted in the absence of a solvent or in the presence of a suitable inert solvent, and, if desired, they may be carried out under reduced pressure so that the alcohol Z′–OH, which is produced, is removed from the system by distillation. If the transesterification reaction, under practical conditions, does not proceed absolutely to completion, or if non-stoichiometric proportions of the reactants are used, there may be left in the crude product of Formula I some small amount of compounds of Formulae XII and/or Z—OH. The presence of small proportions of such contaminants does not as a rule deleteriously affect, and may even favourably influence, the technical properties of the hardened epoxyesters. Accordingly, it is generally unnecessary to isolate the pure mono-epoxy unsaturated ester of Formula I from the reaction mixture in which it is formed.

In the above transesterification reaction it is preferred to use as the alcohol Z—OH any of the alcohols corresponding to the preferred values of Z set forth above. The alcohols which correspond to the residues of Formula VI may be formed by the addition of water or of glycols of the general formula $H(O.CHR_9.CHR_{10})_pOH$, where $R_9$, $R_{10}$ and $p$ are as defined above, to dicyclopentadiene under acidic conditions, and subsequent epoxidation of the olefinic-alcohol thus obtained, either with a peracid or via formation and dehydrohalogenation of a halohydrin.

The planar Formula VI is a generalized representation of the residue Z and corresponds to two stereoisomeric epoxides which may be obtained from the corresponding olefins by epoxidation, on the one hand by using a peracid, and on the other hand by proceeding via formation and dehydrohalogenation of a halohydrin-type intermediate. A more precise representation of these Z residues is given by the Formulae VIa and VIb (not necessarily respectively):

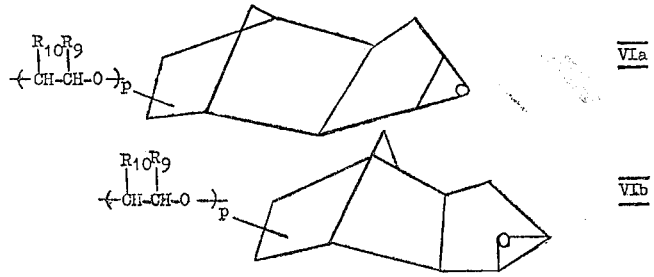

which illustrate the different degrees of shielding, and hence reactivity, of the epoxide groupings in the two isomers.

Particularly useful alcohols of this class are the epoxy-dihydrodicyclopentadienols VIa and VIb in which $p=0$, and the epoxidized ethylene glycol 1:1-adducts of dicyclopentadiene of Formulae VIa and VIb wherein $p=1$ and $R_9=R_{10}=H$.

Those epoxy esters of Formula I in which Z represents an acyclic residue in which the epoxy group lies adjacent to the carbon atom which is attached to the —C(O)—O— ester grouping may conveniently be prepared by reacting an alkali metal salt of the appropriate unsaturated acid with the appropriate epoxyalkyl halide, for example, of the general formula:

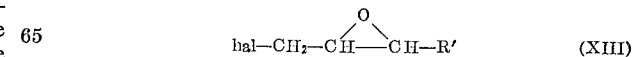
(XIII)

in which R′ represents a hydrogen atom or a methyl group and "hal" represents a halogen atom, preferably a chlorine atom.

The vanadyl chelate compounds of Formula II are in general known compounds. Preferred examples of such compounds are vanadyl bis(acetylacetonate), vanadyl bis(p-acetoxybenzoylacetonate), vanadyl bis(p-hydroxybenzoylacetonate), and vanadyl bis(2-methyl-4,6-dioxononane).

Examples of di- or poly-basic acids and their anhydrides which may be used in the new compositions are phthalic anhydride, methylendomethylenetetrahydrophthalic anhydride, and hexahydrophthalic anhydride, maleic anhydride, succinic anhydride, adipic acid, phthalic acid, pyromellitic dianhydride, and their mixtures.

In some cases, if desired, other accelerators for the hardening may also be present in addition to the vanadyl chelates of Formula II above. Suitable such accelerators are, for example, tertiary amines such as benzyldimethylamine, and polyhydroxy-compounds such as hexanetriol and glycerol.

The hardenable compositions of the invention may optionally contain a proportion of an olefinically unsaturated amide or ester free from epoxy groups, such as an ester of Formula XII, and/or hydroxy-compounds, such as those conforming to the formula Z—OH, Z being as hereinbefore defined, and/or transesterification catalysts and/or inhibitors of free radical polymerisation.

Other epoxy resins which are capable of reacting with the aforesaid polycarboxylic acid or anhydride hardeners may also be present in the compositions of this invention. Such other resins include, for example, bis- and poly-epoxides such as di- or poly-glycidyl ethers of di- or poly-alcohols or of di- or poly-phenols, such as bis(4-hydroxyphenyl)dimethylmethane, polyglycidyl esters of polycarboxylic acids, epoxidized polyolefinic compounds such as epoxidized unsaturated fatty acid esters (e.g. epoxidized soya-bean oil) epoxidized homo- and co-polymers of acyclic and alicyclic conjugated dienes (e.g. butadiene and cyclopentadiene), and epoxide-containing alicyclic polyolefinic compounds, e.g. the esters of tetrahydrobenzoic acid with polyols, polyglycidyl esters of polycarboxylic acids, such as phthalic acid, or aminopolyepoxides such as are obtained by dehydrohalogenation of the reaction products from epihalohydrins and primary or secondary amines such as n-butylamine, aniline, or 4,4′-di(monomethylamino)diphenylmethane.

The compositions of this invention may also contain fillers, plasticizers or colouring agents, for example asphalt, bitumen, glass fibres, mica, quartz powder, cellulose, kaolin, finely-divided kieselguhr, finely-divided silica of large specific surface area such as that available under the registered trademark "Aerosil," or metal powder.

The aforesaid compositions may be used in the filled or unfilled state; e.g. in the form of solutions or emulsions, as textile auxiliaries, laminating resins, varnishes, lacquers, dipping resins, casting resins, and encapsulating, coating, filling and packing materials, moulding compositions, adhesives and the like, as well as for the preparation of such materials.

The following examples will serve to illustrate the invention. The term "Martens value" denotes that obtained according to a modification of the Martens D.I.N. procedure in which a small sample is employed. Such values, while not identical with those obtained in the D.I.N. procedure, are mutually comparable.

*Example I*

A crude sorbate ester starting material was prepared as follows:

To dihydrodicyclopentadienol (150 parts by weight) in glacial acetic acid (600 parts by weight) was added tertiary butyl hypochlorite (125 parts by volume) over a period of 2 hours, the temperature being maintained at 15–20° C. by cooling throughout. The mixture was then set aside for 18 hours, and acetic acid was then distilled off under 15 mm. pressure at temperatures up to 100° C. The residue was dissolved in a solution of potassium hydroxide (168 parts by weight) in isopropanol (4000 parts by volume) and heated at 60° C. with stirring for 2 hours. The isopropanol was then distilled off under 15 mm. pressure at temperatures not above 60° C., the residue dissolved in ether (1000 parts by volume) and water (500 parts), the layers separated, and the aqueous layer washed with ether (200 parts by volume). The combined ether extracts were then washed with half-saturated potassium bisulphate solution (250 parts by volume) and with saturated sodium chloride solution (250 parts by volume), dried over sodium sulphate, filtered, and the ether distilled off. The residue was distilled, passing over mainly at 120–122° C. under 0.5 mm. pressure.

The resulting epoxy-alcohol (336 g., 2 moles) was mixed with n-propyl sorbate (339 g., 2.2 moles) and dibutyl tin oxide (2.5 g.) and hydroquinone (0.1 g.). The mixture was stirred in an atmosphere of nitrogen at 140° C. at such a pressure that propanol was distilled off through a column packed with glass Fenske helices. After a total heating period of 5 hours, the pressure was reduced to ca. 1 mm., and heating was continued for a further 40 minutes. The pale yellow residue which was obtained was a mobile liquid which had an epoxy value of 2.82 epoxy equivalents per kg. (when determined by the HBr-acetic acid method), and a diene content of 3.5 conjugated double bonds per kg. (theoretical value= 3.84), and consisted of crude sorbate ester of epoxy-dihydrodicyclopentadienol.

The epoxy ester obtained as described above (10 g.) was heated to 120° C. and phthalic anhydride (3 g.) and vanadyl bis(acetylacetonate) (0.2 g.) were stirred in until a homogeneous solution was obtained. The resulting mixture was cast into an aluminium mould and heated at 140° C., at which temperature it gelled within 15 minutes. After heating for 2 hours at 140° C. the casting had a Martens value of 176° C.; this value rose to 202° C. after a further 2 hours heating at 140° C., and to 218° C. after a total of 64 hours at 140° C. The castings obtained in this way were hard, non-brittle, and insoluble and infusible.

When the chelate accelerator was omitted, or when it was replaced by dioxomolybdenum bis(acetylacetonate), aluminium octylacetoacetate, or copper bis(acetylacetonate), the resulting resins were very weak and brittle, and had low thermal stability.

*Example II*

The epoxy-ester described in Example I (10 g.) was mixed with vanadyl bis(acetalacetonate) (0.2 g.) and phthalic anhydride (8 g.). After the mixture had been heated for 3 hours at 140° C., a hard casting with a Martens value of 135° C. was obtained. When the vanadyl chelate was replaced by benzyldimethylamine (0.1 g.), a very weak casting was obtained, whose strength was so low that no measurement of its Martens value could be made.

*Example III*

10 g. of the epoxy-ester described in Example I were mixed with 3 g. of phthalic anhydride and 0.2 g. of vanadyl bis(p-acetoxybenzoylacetonate). The mixture gelled in less than 40 min. at 140° C. and gave a hard casting having a Martens value of 160° C. after a cure of 2 hours at 140° C., which rose to 200° C. after a cure of 26 hours at 140° C.

*Example IV*

The epoxy-ester described in Example I (10 g.) was mixed with methylendomethylenetetrahydrophthalic anhydride (4.6 g.) and vanadyl bis(p-hydroxybenzoylacetonate) (0.2 g.). The resulting mixture gelled in less than 90 minutes at 140° C. and, after 2 hours at this temperature, gave a cured resin with Martens value 59° C. This value rose to 165° C. after a cure of 26 hours at 140° C.

*Example V*

The epoxy-ester described in Example I (10 g.) was mixed with methylendomethylenetetrahydrophthalic anhydride (4.3 g.) and vanadyl acetylacetonate (0.2 g.). The resulting mixture gave a cured resin with a Martens value of 140° C. after 4 hours at 140° C., and this value rose to 180° C. after a cure of 21 hours at 140° C., and to 230° C. after a post-cure of 24 hours at 160° C.

*Example VI*

An epoxy-ester starting material was prepared as follows:

A mixture of dihydrodicyclopentadienyl alcohol (50 g.), chloroform (100 ml.) and sodium acetate (10 g.) was stirred at 30° C. and a solution of commercial peracetic acid (77 ml. of a solution containing 4.88 g. mol. of $CH_3.CO_3H$ per litre) was added during 15 minutes. The mixture was maintained at 30° C. for a further 4 hours, then water (200 ml.) and chloroform (100 ml.) were added. The layers were separated, and the aqueous layer was washed with chloroform (50 ml.). The chloroform washings were combined with the original organic layer, and were then shaken with 200 ml. of a saturated aqueous solution of sodium bicarbonate. The layers were separated and the aqueous layer was extracted with chloroform (50 ml.). The combined organic layers were then shaken with a saturated ferrous sulphate solution (150 ml.), the layers were separated and the aqueous layer extracted with chloroform (50 ml.). The combined organic layers were washed with water (200 ml.), the layers separated, and the aqueous layer extracted with chloroform (50 ml.). The combined organic layers were dried over anhydrous magnesium sulphate and then filtered. The solvent was evaporated from the filtrate, and then the product distilled under high vacuum to give a colourless oil (54 g.), B.P. 110–111° C./0.2 mm.

The resulting epoxy alcohol was transesterified with propyl sorbate essentially as described in Example I above. The epoxy-ester thus obtained was a viscous brown oil of epoxy value 3.2 epoxy equiv. per kg. (when determined by the HBr-acetic acid method), and had a conjugated diene content of 2.65 per kg.

This epoxy-ester (12 g.) was mixed with phthalic anhydride (3.6 g.) and vanadyl bis(acetylacetonate) (0.25 g.). When heated for 3 hours at 130° C. this mixture gave a cured resin having Martens value 121° C.; this value rose to 140° C. after a post-cure of 5½ hours at 140° C.

*Example VII*

An epoxy-ester starting material was prepared as follows:

Ethylene glycol was reacted with dicyclopentadiene as described in United States Patent No. 2,393,609. The resulting unsaturated alcohol was epoxidized by treatment with butyl hypochlorite followed by subsequent dehydrohalogenation with alkali by a process similar to that employed in Example I to yield the desired epoxy ester as a viscous brown oil of epoxy value 2.38 epoxy equivalents per kg., when determined by the HBr-acetic acid method.

This epoxy-ester (12 g.) was mixed with phthalic anhydride (3 g.) and vanadyl bis(acetylacetonate) (0.25 g.) to yield a mixture which on hardening for 2 hours at 140° C. gave a casting having a Martens value of 77° C.; after a further 2 hours at the same temperature this value rose to 83° C.

*Example VIII*

Glycidyl sorbate (prepared as described in United States Patent No. 2,457,300, Example 4) (10 g.) was mixed with methylendomethylenetetrahydrophthalic anhydride (8.5 g.) and vanadyl bis(acetylacetonate) (0.1 g.) and vanadyl bis(p-acetoxybenzoylacetonate) (0.1 g.). The resulting mixture gelled in less than 20 minutes at 160° C., and after hardening for 17 hours at 160° C. gave a hard resin of Martens value 125° C.

*Example IX*

An epoxy-ester starting material was prepared as follows:

The epoxy-alcohol described in Example I was transesterified with butyl acrylate essentially as described in Example I to give an unsaturated epoxy-cycloalkyl acrylate as a dark mobile oil, epoxy value 3.57 equiv./kg.

This ester (8 g.) was mixed with phthalic anhydride (4 g.) and vanadyl bis(acetylacetonate) (0.16 g.) to yield a mixture which gelled in less than 15 min. at 145° C., and which, after 2 hours at this temperature, gave a hardened casting of Martens value 199° C.

*Example X*

A mixture of glycidyl methacrylate (10 g.), phthalic anhydride (8 g.) and vanadyl bis(acetylacetonate) (0.1 g.) was warmed with stirring until it became homogeneous. It was then cast into a mould and cured for 80 mins. at 80° C. and then for 2 hours at 140° C. The resulting clear, hardened resin had a Martens value of 79° C., and this value rose to 210° C. after a post-cure of 16 hours at 140° C.

A second mixture was prepared as described above, but 1.0 g. of Aerosil was added to the mixture before hardening. After a cure of 1 hour at 80° C. plus 2 hours at 140° C., castings having a Martens value of 95° C. were obtained; this value rose to 225° C. after an additional hardening period of 16 hours at 140° C.

*Example XI*

The ethylene glycol diether of the epoxy alcohol described in Example I was prepared as follows:

Tertiary-butyl hypochlorite (500 parts by volume, 96% activity) was added over 4.5 hours to a stirred solution of ethylene glycol bis(dihydrodicyclopentadienyl ether) (652 parts by weight) in acetic acid (2,400 parts by weight); the temperature was maintained at 15–20° C. by cooling in ice throughout. After 2 hours at room temperature the acetic acid and butanol were distilled off in vacuo at temperatures up to 90° C., and the residual acetic acid was neutralized with 50% aqueous sodium hydroxide. The mixture was diluted with dioxan (500 parts by volume), sodium hydroxide (400 parts by weight) in 50% aqueous solution added and the mixture refluxed for 17 hours. The resulting dark suspension was evaporated to low bulk under water-pump vacuum at below 90° C., and extracted with petroleum (of boiling range 100–120° C., 6,000 parts by volume in three portions) to yield on evaporation 684 parts by the diepoxide.

This material (10 g.) was mixed with the epoxy-ester described in Example I above (5 g.), and the mixture heated to 120° C.; phthalic anhydride (6.7 g.) and vanadyl bis(2-methyl-4,6-dioxononane) (0.3 g.) were then added. The mixture was then cast into an aluminum mould, and heated for 2 hours at 140° C.; a casting having a Martens value of 165° C. resulted.

*Example XII*

The epoxy alcohol described in Example VI was transesterified with methyl methacrylate in the presence of a sodium methoxide catalyst, and free-radical inhibitors. The epoxy-ester was obtained by distillation as a colourless liquid having an epoxy content (when determined by the HBr-acetic acid method) of 4.2 epoxy equiv. per kg.

This epoxy-ester (10 g.) was stirred at 120° C. with hexahydrophthalic anhydride (6.4 g.) and vanadyl bis(2-methyl-4,6-dioxononane) (0.2 g.) until homogeneous, and poured into aluminum moulds. After heating for 2 hours at 160° C., cured castings having a Martens value of 136° C. were obtained; this value rose to 215° C. after a post-cure of 4 hours at 160° C.

*Example XIII*

The epoxy resin of the formula

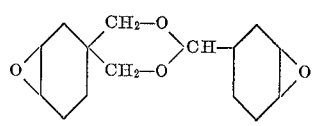

(5.0 g.) was mixed with the epoxy-ester described in Example XII (3.3 g.). The mixture was heated at 120° C. with hexahydrophthalic anhydride (8.0 g.) and vanadyl bis(2-methyl-4,6-dioxononane) (0.15 g.). This mixture was then heated for 3 hours at 160° C., a hard cured resin having a Martens value of 180° C. being obtained; this rose to 215° C. after heating for a further 2 hours at 180° C.

*Example XIV*

An epoxy resin, obtained by the epoxidation of dihydrodicyclopentadienyl glycidyl ether with peracetic acid (as described in French Patent No. 1,261,102) was mixed with methacrylic acid (15.7 g.) and hydroquinone (1 g.). The mixture was heated for 130 minutes at 140° C.; its epoxy value fell from 5.39 to 3.29 equivalent per kg. This material (10 g.) was mixed with hexahydrophthalic anhydride (5.1 g.) and vanadyl bis(2-methyl-4,6-dioxononane) (0.3 g.), and the mixture was heated for 19 hours at 120° C. and then for 2 hours at 180° C. A hard casting having a Martens value of 91° C. resulted.

*Examples XV-XXXIX*

In order to demonstrate the possibility of introducing copolymerisable monomers into mixtures containing unsaturated monoepoxides, anhydride hardeners and vanadyl chelates, the 60:40 mixture of epoxides described in Example XIII was treated with hexahydrophthalic anhydride, vanadyl bis(2-methyl-4,6-dioxononane) and various monomers. On heating, hard strong castings were obtained in every case. The reactants and results are shown in the table below.

This material (11.0 g.) was mixed with hexahydrophthalic anhydride (6.2 g.) and vanadyl bis(2-methyl-4,6-dioxononane) (0.3 g.); after heating at 120° C. for 18 hours a brittle, infusible, hardened resin was obtained.

What is claimed is:
1. A hardenable composition of matter which comprises
 (1) an unsaturated monoepoxy ester of the formula

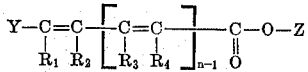

wherein Z represents a member selected from the group consisting of a radical

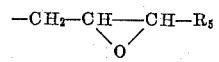

wherein $R_5$ is a member selected from the group consisting of hydrogen atom and lower alkyl group of 1 to 4 carbon atoms; a radical

where A is a member selected from the group consisting of alkylene radicals and alkylene radicals interrupted by oxygen ether bridges, and $p$ is an integer

| Example No. | Epoxide mixture (g.) | Anhydride (g.) | Chelate (g.) | Name | G. | Cure cycle [1] | Martens value of casting |
|---|---|---|---|---|---|---|---|
| XV | 8.3 | 8 | 0.3 | Diallyl maleate | 0.7 | A | 142 |
| XVI | 8.3 | 8 | 0.3 | ...do... | 1.4 | A | 132 |
| XVII | 8.3 | 8 | 0.3 | Methylene bisacrylamide | 0.55 | A | 160 |
| XVIII | 8.3 | 8 | 0.3 | ...do... | 0.55 | B | 223 |
| XIX | 8.3 | 8 | 0.3 | Diisopropyl itaconate | 1.8 | A | 120 |
| XX | 8.3 | 8 | 0.3 | ...do... | 1.8 | B | 161 |
| XXI | 8.3 | 8 | 0.3 | ...do... | 3.6 | A | 97.5 |
| XXII | 8.3 | 8 | 0.3 | ...do... | 3.6 | B | 170 |
| XXIII | 8.3 | 8 | 0.3 | Dihydrodicyclopentadienyl methacrylate. | 1.55 | A | 124 |
| XXIV | 8.3 | 8 | 0.3 | ...do... | 1.55 | B | 209 |
| XXV | 8.3 | 8 | 0.3 | ...do... | 3.1 | A | 120 |
| XXVI | 8.3 | 8 | 0.3 | ...do... | 3.1 | B | 168 |
| XXVII | 8.3 | 8 | 0.3 | Ethylene glycol disorbate | 0.9 | A | 140 |
| XXVIII | 8.3 | 8 | 0.3 | ...do... | 0.9 | B | 205 |
| XXIX | 8.3 | 8 | 0.3 | ...do... | 1.8 | A | 141 |
| XXX | 8.3 | 8 | 0.3 | ...do... | 1.8 | B | 204 |
| XXXI | 8.3 | 8 | 0.3 | ...do... | 0.45 | A | 140 |
| XXXII | 8.3 | 8 | 0.3 | Polyester [2] | 5.2 | A | 134 |
| XXXIII | 8.3 | 8 | 0.3 | ...do... | 5.2 | B | 137 |
| XXXIV | 8.3 | 8 | 0.3 | ...do... | 2.6 | A | 122 |
| XXXV | 8.3 | 8 | 0.3 | ...do... | 2.6 | B | 198 |
| XXXVI | 8.3 | 8 | 0.3 | Diallylphthalate | 0.9 | C | 168 |
| XXXVII | 8.3 | 8 | 0.3 | ...do... | 0.9 | D | >200 |
| XXXVIII | 8.3 | 8 | 0.3 | ...do... | 1.8 | C | 111 |
| XXXIX | 8.3 | 8 | 0.3 | ...do... | 1.8 | D | 182 |

[1] Cure cycles: A=120° C./20 hours; B=120° C./20 hours+180° C./2 hours; C=120° C./6 hours; D=120° C./6 hours+180° C./2 hours.

[2] The polyester was prepared in the following manner: Isophthalic acid (1245 parts by weight), phthalic anhydride (222 parts by weight) and propane-1,2-diol (1435 parts by weight) were heated under nitrogen at 180–210° C. and the water formed by the esterification was distilled through a fractionating column until the acid value of the mixture was less than 5. Maleic anhydride (881 parts by weight) was then added, and esterification continued by heating the mixture at 200–220° C. until the acid value was 25. There resulted a solid polyester resin (3300 parts) with a softening point of 65° C. (Kofler block), a double-bond content of 2.74 equivalents/kg. and an average molecular weight of 1930.

*Example XL*

A mixture of 3-oxatricyclo(3,2,1,0$^{2,4}$)oct-6-yl alcohol (25.2 g.), propyl sorbate (33.9 g.), dibutyl tin oxide (0.5 g.) and hydroquinone (0.2 g.) was heated at 140–150° C. in an apparatus fitted with a vertical Vigreux column leading to a distillation condenser. A stream of dry nitrogen was passed through the mixture, and the pressure was gradually reduced to 15 mm. Hg. After heating for 5 hours at 150° C./15 mm., plus 2 hours at 150° C./0.2 mm., a brown, viscous oil was obtained. The infra-red absorption spectrum of this product showed strong bands at 1720 cm.$^{-1}$ (ester carbonyl) and 856 cm.$^{-1}$ (epoxide), but only weak hydroxyl absorption at ca. 3500 cm.$^{-1}$.

of at least 1 and at the most 2; a radical where $R_6$ and $R_7$ are hydrogen atoms and together $R_6$ and $R_7$ represent the methylene group; a radical where $R_8$, $R_9$, $R_{10}$, $R_{11}$, $R_{12}$, $R_{13}$, $R_{14}$, $R_{15}$ and $R_{16}$ each are members selected from the group consisting of hydrogen atom and lower alkyl group of 1 to 4 carbon atoms, and together $R_8$ and $R_{12}$ represent the methylene group; a radical

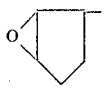

a radical

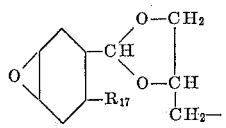

and a radical

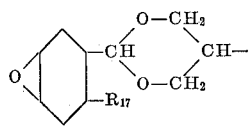

where $R_{17}$ is a member selected from the group consisting of hydrogen atom and lower alkyl group of 1 to 4 carbon atoms; Y represents a member selected from the group consisting of hydrogen atom, alkyl group and alkenyl group, $R_1$, $R_2$, $R_3$ and $R_4$ each are members selected from the group consisting of hydrogen atom and lower alkyl group of 1 to 4 carbon atoms, and $n$ is an integer of at least 1 and at the most 2;

(2) a polycarboxylic acid anhydride; and
(3) a vanadyl chelate of the formula

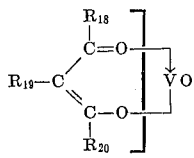

where $R_{18}$ is a member of the group consisting of hydrogen atom, alkyl group of 1 to 6 carbon atoms, the phenyl group, the hydroxy-phenyl group and the acetoxyphenyl group, $R_{19}$ is a member selected from the group consisting of hydrogen atom and alkyl group of 1 to 6 carbon atoms, and $R_{20}$ is an alkyl group of 1 to 6 carbon atoms.

2. A composition as claimed in claim 1 which contains glycidyl sorbate as the monoepoxy ester.

3. A composition as claimed in claim 1 which contains 3,4-epoxy-tetrahydrodicyclopentadien-8-yl sorbate as the monoepoxy ester.

4. A composition as claimed in claim 1 which contains 3,4-epoxy-tetrahydrodicyclopentadien-8-yl acrylate as the monoepoxy ester.

5. A composition as claimed in claim 1 which contains 3,4-epoxy-tetrahydrodicyclopentadien - 8 - yl methacrylate as the monoepoxy ester.

6. A composition as claimed in claim 1 which contains 3-oxatricyclo$(3,2,1,0^{2,4})$oct-6-yl sorbate as the monoepoxy ester.

7. A composition as claimed in claim 3, which contains 2-[3',4'-epoxy-tetrahydrocyclopentadien - 8' - yloxy]ethyl sorbate as the monoepoxy ester.

8. A composition as claimed in claim 1, which contains a dicarboxylic acid anhydride selected from the group consisting of phthalic anhydride, methylendomethylene-tetrahydrophthalic anhydride and hexahydrophthalic anhydride as the polycarboxylic acid anhydride.

9. A composition as claimed in claim 1, which contains a compound selected from the group consisting of vanadyl bis(acetylacetonate), vanadyl bis(p - acetoxybenzoylacetonate), vanadyl bis(p-hydroxybenzoylacetonate), and vanadyl bis(2-methyl-4,6-dioxononane) as the vanadyl chelate.

10. A composition as claimed in claim 1, which contains in addition a 1,2-epoxy compound having a 1,2-epoxy equivalency greater than 1.

11. A composition as claimed in claim 1, which contains in addition an olefinically unsaturated ester free from epoxy groups.

12. A composition as claimed in claim 1, which contains in addition an olefinically unsaturated amide.

No references cited.

JOSEPH L. SCHOFER, *Primary Examiner.*